(12) United States Patent
Fujiwara et al.

(10) Patent No.: US 6,200,370 B1
(45) Date of Patent: Mar. 13, 2001

(54) JET PRINTING INK AND INK-JET RECORDING METHOD

(75) Inventors: Toshiki Fujiwara; Takayoshi Kamio, both of Minami-ashigara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/409,679

(22) Filed: Sep. 30, 1999

(30) Foreign Application Priority Data

Sep. 30, 1998 (JP) .................................. 10-278024

(51) Int. Cl.[7] .................................................. C09D 11/02
(52) U.S. Cl. .................. 106/31.48; 106/31.5; 106/31.51
(58) Field of Search .............................. 106/31.48, 31.5, 106/31.51

(56) References Cited

U.S. PATENT DOCUMENTS

| | | | | |
|---|---|---|---|---|
| 5,208,325 | * | 5/1993 | Berneth et al. | 106/31.5 |
| 5,330,542 | * | 7/1994 | Maeda et al. | 106/31.5 |
| 5,567,470 | * | 10/1996 | Koshida et al. | 106/31.5 |
| 5,580,964 | * | 12/1996 | Berneth et al. | 106/31.5 |
| 5,622,550 | * | 4/1997 | Konishi et al. | 106/31.5 |
| 5,777,089 | * | 7/1998 | Beckmann et al. | 106/31.5 |
| 5,779,781 | * | 7/1998 | Gregory et al. | 106/31.51 |
| 5,883,232 | * | 3/1999 | Hida et al. | 105/31.5 |
| 5,952,475 | * | 9/1999 | Berneth | 106/31.5 |
| 5,986,075 | * | 11/1999 | DuBose et al. | 106/31.48 |
| 5,997,628 | * | 12/1999 | Bindra | 106/31.5 |

* cited by examiner

Primary Examiner—Helene Klemanski
(74) Attorney, Agent, or Firm—Birch, Stewart, Kolasch & Birch, LLP

(57) ABSTRACT

A jet printing ink contains an azo dye of the formula (I):

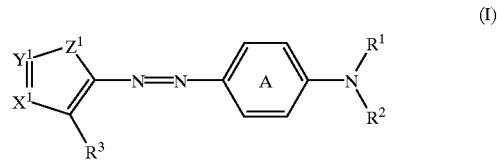

wherein $X^1$ is =N— or =CR$^4$—; $Y^1$ is —N= or —CR$^5$=; $Z^1$ is —S—, —NR$^6$— or —N=CR$^7$— in which the right end of each group connects to $Y^1$; the benzene ring A can have a substituent; each of $R^1$, $R^2$ and $R^6$ is hydrogen, an alkyl group, a cycloalkyl group, an aralkyl group, or an aryl group (each group possibly has one or more substituens); each of $R^3$, $R^4$, $R^5$ and $R^7$ is hydrogen, a halogen atom, cyano, hydroxyl, nitro, carboxyl, sulfo, an alkyl group, a cycloalkyl group, an aralkyl group, an aryl group, an alkoxy group, an alkylthio group, an acyl group, an acyloxy group, an alkoxycarbonyl group, an alkylamino group, an arylamino group, or an alkylsufonyl group; or a set of $R^1$ and $R^2$, $R^1$ and the substituent of the benzene ring A, $R^2$ and the substituent of the benzene ring A, $R^3$ and $R^4$, $R^4$ and $R^5$, or $R^5$ and $R^6$ can be combined to form a heterocyclic or aromatic ring which can have a substituent; and at least one of $R^1$, $R^2$, $R^3$, $R^4$, $R^5$, $R^6$, $R^7$, the substituent of the benzene ring A, and the substituent of the formed heterocyclic or aromatic ring has at least one carboxyl or sulfo group.

7 Claims, No Drawings

JET PRINTING INK AND INK-JET RECORDING METHOD

FIELD OF THE INVENTION

The present invention relates to a jet printing ink and an ink image-forming method using an ink jet printer.

BACKGROUND OF THE INVENTION

An ink-jet recording method has been developed and widely used because it has various merits. For example, materials for the method are available at a low cost, and high speed recording can be accomplished. Further, the method makes relatively low noise, and easily utilizable for full-color recording.

As the ink-jet recording method, three types are known. One is a method in which drops of ink are pressured to be ejected by means of a piezoelectric element. In another method, bubbles are formed in ink by heating so that the bubbles would push out drops of the ink. The other is a method in which drops of ink are sucked and ejected with electrostatic force. As the ink for the method (i.e., jet printing ink), various kinds of ink such as aqueous ink, oily ink, and solid (melting) ink have been used.

Dyes used for the ink must satisfy various conditions. For example, they must be highly soluble in a solvent, and they must have excellent hues. It is also necessary for the dyes to have high resistance against light, heat, air, water and chemicals. Further, they must be well fixed onto an image-receiving sheet without blotting. They are furthermore required to have long shelf lives, to have no toxicity, to have high purity, and to be available at a low cost. However, there are few dyes fully satisfying those conditions, and in particular it is desired to develop dyes having excellent magenta or cyan hue and high resistance to light.

Various dyes or pigments have been proposed and practically employed for ink-jet recording, but there is no dye (or pigment) fully satisfying all the aforementioned conditions. Conventional dyes or pigments (such as those having C.I. Number) cannot satisfy the conditions of both having high resistance and giving hues necessary for ink-jet recording. Japanese Patent Provisional Publications No. 61-36362 and No. H2-212566 disclose jet printing inks. Those inks give satisfying hues and have good durability, but the dyes disclosed in the Publications have not enough solubility in water to prepare an aqueous ink. Further, even if the dyes are used in aqueous ink, the prepared ink has poor resistance against heat and moisture.

SUMMARY OF THE INVENTION

It is an object of the present invention to provide an improved jet printing ink and an ink-jet recording method, in which the ink has excellent magenta or cyan hue, and gives an image having good durability.

There is provided by the invention a jet printing ink containing an azo dye represented by the following formula (I):

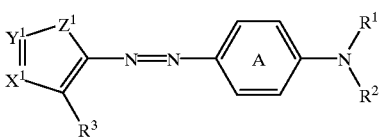

wherein $X^1$ is =N— or =CR$^4$—; $Y^1$ is —N= or —CR$^5$=; $Z^1$ is —S—, —NR$^6$— or —N=CR$^7$— in which the right end of each group connects to $Y^1$; the benzene ring A can have one or more substituents; each of $R^1$, $R^2$ and $R^6$ independently represents a hydrogen atom, an alkyl group, a cycloalkyl group, an aralkyl group, or an aryl group, said group possibly having one or more substituents; each of $R^3$, $R^4$, $R^5$ and $R^7$ independently represents a hydrogen atom, a halogen atom, cyano, hydroxyl, nitro, carboxyl, sulfo, an alkyl group, a cycloalkyl group, an aralkyl group, an aryl group, an alkoxy group, an alkylthio group, an acyl group, an acyloxy group, an alkoxycarbonyl group, an alkylamino group, an arylamino group, or an alkylsufonyl group; or a set of $R^1$ and $R^2$, $R^1$ and the substituent of the benzene ring A, $R^2$ and the substituent of the benzene ring A, $R^3$ and $R^4$, $R^4$ and $R^5$, or $R^5$ and $R^6$ can be combined to form a heterocyclic or aromatic ring which can have one or more substituents; and at least one of $R^1$, $R^2$, $R^3$, $R^4$, $R^5$, $R^6$, $R^7$, the substituent of the benzene ring A, and the substituent of the formed heterocyclic or aromatic ring has at least one carboxyl or sulfo group.

In the invention, the azo dye is preferably represented by the following formula (II):

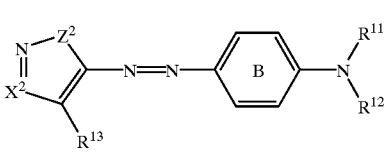

wherein $X^2$ is =N— or =CR$^{14}$—; $Z^2$ is —S— or —NR$^{15}$—; the benzene ring B can have a substituent; each of $R^{11}$, $R^{12}$ and $R^{15}$ independently represents hydrogen atom, an alkyl group, a cycloalkyl group, an aralkyl group or an aryl group, said group possibly having one or more substituents; each of $R^{13}$ and $R^{14}$ independently represents hydrogen atom, a halogen atom, cyano, hydroxyl, nitro, carboxyl, sulfo, an alkyl group, a cycloalkyl group, an aralkyl group, an aryl group, an alkoxy group, an alkylthio group, an acyl group, an acyloxy group, an alkoxycarbonyl group, an alkylamino group, an arylamino group or an alkylsulfonyl group; or a set of $R^{11}$ and $R^{12}$, $R^{11}$ and the substituent of the benzene ring B, $R^{12}$ and the substituent of the benzene ring B, or $R^{13}$ and $R^{14}$ can be combined to form a heterocyclic or aromatic ring which can have a substituent; and at least one of the substituent of $R^{11}$, $R^{12}$, $R^{13}$, $R^{14}$, $R^{15}$, the benzene ring B, and the substituent of the formed heterocyclic or aromatic ring has at least one carboxyl or sulfo group.

In the formula (I), at least one of $R^1$, $R^2$, $R^3$, $R^4$, $R^5$, $R^6$, $R^7$, the substituent of the benzene ring A, and the substituent of the formed heterocyclic or aromatic ring preferably has at least one sulfo group. Also preferred is that at least two of $R^1$, $R^2$, $R^3$, $R^4$, $R^5$, $R^6$, $R^7$, the substituent of the benzene ring A, and the substituent of the formed heterocyclic or aromatic ring has at least one sulfo or carboxyl group.

The ink of the invention preferably comprises an aqueous medium and the azo dye of the formula (I) that is dissolved in the aqueous medium, particularly, in an amount of 0.2 to 10 wt. %.

The invention further resides in a method of forming an ink image on a receiving sheet using an ink jet printer, which comprises jetting drops of an ink containing an azo dye of the aforementioned formula (I).

DETAILED DESCRIPTION OF THE INVENTION

The jet printing ink of the invention contains an azo dye of the aforementioned formula (I).

The benzene ring A in the formula (I) may have a substituent. Examples of the substituents include a halogen atom, cyano, hydroxyl, nitro, carboxyl, sulfo, amino, an alkyl group, a cycloalkyl group, an aralkyl group, an aryl group, a heterocyclic group, an alkylamino group, an alkoxy group, an aryloxy group, an amido group, an arylamide group, an ureido group, a sulfamoylamino group, an alkylthio group, an arylthio group, an alkoxycarbonylamino group, a sulfonamide group, a carbamoyl group, a sulfamoyl group, an alkylsulfonyl group, an arylsulfonyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imido group, a heterocyclic thio group, a sulfinyl group, a phosphoryl group, and an acyl group. Preferred examples are a halogen atom, an alkyl group, an aryl group, cyano, an alkoxy group, an amido group, an ureido group, an alkoxycarbonylamino group, a sulfonamide group, a carbamoyl group, a sulfamoyl group, and an alkoxycarbonyl group. Particularly preferred examples are a halogen atom, an alkyl group, an alkoxy group, an amido group, an ureido group, and a sulfonamide group.

Examples of the halogen atoms include fluorine, chlorine and bromine.

The alkyl group preferably comprises 1 to 12 (more preferably 1 to 6, further preferably 1 to 3) carbon atoms, and may have a substituent. Examples of the substituents include hydroxyl, an alkoxy group, a halogen atom, sulfo, and carboxyl. Concrete examples of the alkyl group include methyl, ethyl, butyl, isopropyl, t-butyl, hydroxyethyl, methoxyethyl, cyanoethyl, trifluoromethyl, 3-sulfopropyl, and 4-sulfobutyl.

The cycloalkyl group preferably comprises 5 to 12 carbon atoms, such as cyclohexyl, and may have a substituent. Examples of the substituents include sulfo and carboxyl.

The aralkyl group preferably comprises 7 to 12 carbon atoms, such as benzyl and 2-phenethyl, and may have a substituent. Examples of the substituents include sulfo and carboxyl.

The aryl group preferably comprises 7 to 12 carbon atoms, such as phenyl, p-tolyl, p-methoxyphenyl, o-chlorophenyl and m-(3-sulfopropylamino)-phenyl, and may have a substituent. Examples of the substituents include an alkyl group, an alkoxy group, a halogen atom, an alkylamino group, sulfo and carboxyl.

The heterocyclic group preferably comprises a 5- or 6-membered ring, such as 2-pyridyl, 2-thienyl and 2-furyl, and may have a substituent. Examples of the substituents include sulfo and carboxyl.

The alkylamino group preferably comprises 1 to 6 carbon atoms, such as methylamino and diethylamino, and may have a substituent. Examples of the substituent include sulfo and carboxyl.

The alkoxy group preferably comprises 1 to 12 carbon atoms, such as methoxy, ethoxy, isopropoxy, methoxyethoxy, hydroxyethoxy and 3-carboxypropoxy, and may have a substituent. Examples of the substituents include an alkoxy group, hydroxyl, sulfo and carboxyl.

The aryloxy group preferably comprises 6 to 12 carbon atoms, such as phenoxy, p-methoxypehnoxy, and o-methoxyphenoxy, and may have a substituent. Examples of the substituents include an alkoxy group, sulfo and carboxyl.

The amido group preferably comprises 2 to 12 carbon atoms, such as acetoamide, propionamide, benzamide, and 3,5-disulfobenzamide, and may have a substituent. Examples of the substituents include sulfo and carboxyl.

The arylamino group preferably comprises 6 to 12 carbon atoms, such as anilino and 2-chloroanilino, and may have a substituent. Examples of the substituents include a halogen atom, sulfo and carboxyl.

The ureido group preferably comprises 1 to 12 carbon atoms, such as 3-methylureido, 3,3-dimethylureido, and 3-phenylureido, and may have a substituent. Examples of the substituents include an alkyl group and an aryl group.

The sulfamoylamino group preferably is N,N-dipropyl-sulfamoylamino and may have a substituent. Examples of the substituents include an alkyl group.

The alkylthio group preferably comprises 1 to 12 carbon atoms, such as alkylthio group include methylthio and ethylthio, and may have a substituent. Examples of the substituents include sulfa and carboxyl.

The arylthio group preferably comprises 6 to 12 carbon atoms, such as phenylthio and p-tolylthio, and may have a substituent. Examples of the substituents include an alkyl group, sulfo and carboxyl.

The alkoxycarbonylamino group preferably comprises 2 to 12 carbon atoms, such as ethoxycarbonylamino, and may have a substituent. Examples of the substituents include sulfo and carboxyl.

The sulfonamide group preferably comprises 1 to 12 carbon atoms, such as methanesulfonamide, benzensulfona-mide and 3-carboxybenzenesulfonamide, and may have a substituent. Examples of the substituents include sulfo and carboxyl.

The carbamoyl group preferably is methylcarbamoyl or dimethylcarbamoyl, and may have a substituent. Examples of the substituents include an alkyl group.

The sulfamoyl group preferably is di (2-hydroxyethyl) sulfamoyl, and may have a substituent. Examples of the substituent include an alkyl group.

Examples of the alkylsulfonyl groups include methane-sulfonyl.

Examples of the arylsulfonyl groups include benzene-sulfonyl.

The alkoxycarbonyl group preferably comprises 2 to 12 carbon atoms, such as methoxycarbonyl and ethoxycarbonyl, and may have a substituent. Examples of the substituents include sulfa and carboxyl.

The heterocyclic oxy group preferably comprises a 5- or 6-membered ring, such as 2-tetrahydropyranyloxy, and may have a substituent. Examples of the substituents include hydroxyl, sulfo and carboxyl.

Examples of the azo groups include p-nitrophenylazo.

The acyloxy group preferably comprises 1 to 12 carbon atoms, such as acetoxy and benzoyloxy, and may have a substituent. Examples of the substituents include sulfo and carboxyl.

The carbamoyloxy group preferably is N-methylcarbamoyloxy, and may have a substituent. Examples of the substituents include an alkyl group.

The silyloxy group preferably is trimethylsilyloxy, and may have a substituent. Examples of the substituents include an alkyl group.

The aryloxycarbonyl group preferably comprises 7 to 12 carbon atoms, such as phenoxycarbonyl, and may have a substituent. Examples of the substituents include sulfo and carboxyl.

The aryloxycarbonylamino group preferably comprises 7 to 12 carbon atoms, such as phenoxycarbonylamino, and may have a substituent. Examples of the substituents include sulfo and carboxyl.

Examples of the imido groups include N-phthalimido and N-succinimido.

The heterocyclic thio group preferably comprises a 5- or 6-membered ring, such as 2-pyridylthio, and may have a substituent. Examples of the substituents include sulfo and carboxyl.

Examples of the sulfinyl groups include phenylsulfinyl.

Examples of the phosphoryl groups include phenoxyphosphoryl and phenylphosphoryl.

The acyl group preferably comprises 1 to 12 carbon atoms, such as acetyl and benzoyl, and may have a substituent. Examples of the substituents include sulfo and carboxyl.

Carboxyl may be in the form of salt. Examples of the counter ions of the salt include alkali metal ions (e.g., sodium ion, potassium ion) and organic cations (e.g., tetramethylguanidium ion).

Sulfo may be in the form of salt. Examples of the counter ions of the salt include alkali metal ions (e.g., sodium ion, potassium ion) and organic cations (e.g., tetramethylguanidium ion).

In the formula (I), each of $R^1$, $R^2$ and $R^6$ independently represents a hydrogen atom, an alkyl group, a cycloalkyl group, an aralkyl group or an aryl group. These groups may have one or more substituents. Otherwise, each of them is combined with other groups to form a heterocyclic ring. Examples of the groups are the same as those described above for the substituent of the benzene ring A. If the heterocyclic ring is not formed, each of $R^1$, $R^2$ and $R^6$ preferably is an alkyl group. Each of them more preferably is an alkyl group having 1 to 10 (further preferably 1 to 4) carbon atoms.

Each of $R^3$, $R^4$, $R^5$ and $R^7$ in the formula (I) independently represents a hydrogen atom, a halogen atom, cyano, hydroxyl, nitro, carboxyl, sulfo, an alkyl group, a cycloalkyl group, an aralkyl group, an aryl group, an alkoxy group, an alkylthio group, an acyl group, an acyloxy group, an alkoxycarbonyl group, an alkylamino group, an arylamino group, or an alkylsulfonyl group. Otherwise, each of them is combined with other groups to form a heterocyclic or benzene ring. Examples of the groups are the same as those described above for the substituent of the benzene ring A. If the ring is not formed, each of $R^3$, $R^4$, $R^5$ and $R^7$ is preferably a hydrogen atom, a halogen atom, cyano, hydroxyl, carboxyl, sulfo, an alkyl group, an aryl group, an alkoxy group, an alkylthio group, an alkoxycarbonyl group, an alkylamino group, an arylamino group, or an alkylsulfonyl group. In particular, $R^3$ preferably is cyano.

Each set of $R^1$ and $R^2$, $R^1$ and the substituent of the benzene ring A, $R^2$ and the substituent of the benzene ring A, $R^3$ and $R^4$, $R^4$ and $R^5$, or $R^5$ and $R^6$ may in combination form a heterocyclic or aromatic ring.

Examples of the heterocyclic rings (a1 to a3) formed of $R^1$ and $R^2$, those (b1 to b3) formed by $R^1$ or $R^2$ and the substituent of the benzene ring A, and the heterocyclic or aromatic rings (c1 to c3) formed by $R^3$ and $R^4$ are shown below.

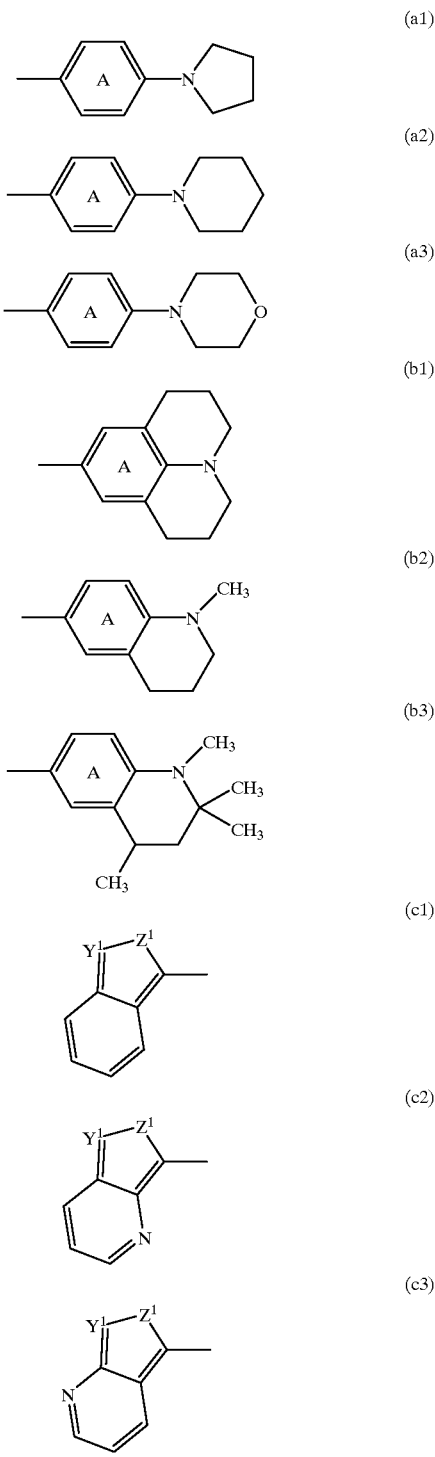

The heterocyclic or aromatic ring formed by those groups may have a substituent. Examples of the substituents are the same as those described above for the substituent of the benzene ring A.

In the formula (I), carboxyl or sulfo should be contained in at least one of $R^1$, $R^2$, $R_3R^4$, $R^5$, $R^6$, $R^7$, the substituent of the benzene ring A, and the substituent of the formed heterocyclic or aromatic ring.

Preferably, sulfo is contained in at least one of $R^1$, $R^2$, $R^3$, $R^4$, $R^5$, $R^6$, $R^7$, the substituent of the benzene ring A, and the substituent of the formed heterocyclic or aromatic ring.

Also preferably, carboxyl or sulfo is contained in at least two of $R^1$, $R^2$, $R^3$, $R^4$, $R^5$, $R^6$, $R^7$, the substituent of the benzene ring A, and the substituent of the formed heterocyclic or aromatic ring.

Further preferably, sulfo is contained in at least two of $R^1$, $R^2$, $R^3$, $R^4$, $R^5$, $R^6$, $R^7$, the substituent of the benzene ring A, and the substituent of the formed heterocyclic or aromatic ring.

It is particularly preferred for the azo dye to have the aforementioned formula (II).

Examples of the substituent for the benzene ring B are the same as those described above for the substituent of the benzene ring A.

Each of $R^{11}$, $R^{12}$ and $R^{15}$ independently is a hydrogen atom, an alkyl group, a cycloalkyl group, an aralkyl group or an aryl group. These group may have one or more substituents. Otherwise, each of them is combined with other groups to form a heterocyclic ring. Examples of the groups are the same as those described above for the substituent of the benzene ring A.

Each of $R^{13}$ and $R^{14}$ independently is a hydrogen atom, a halogen atom, cyano, hydroxyl, nitro, carboxyl, sulfo, an alkyl group, a cycloalkyl group, an aralkyl group, an aryl group, an alkoxy group, an alkylthio group, an acyl group, an acyloxy group, or an alkoxycarbonyl group. Otherwise, each of them is combined with other groups to form a heterocyclic ring. Examples of the groups are the same as those described above for the substituent of the benzene ring A.

A set $R^{11}$ and $R^{12}$, $R^{11}$ and the substituent of the benzene ring B, $R^{12}$ and the substituent of the benzene ring B, or $R^{13}$ and $R^{14}$ may be combined to form a heterocyclic or aromatic ring. The ring may have a substituent. Examples of the substituents are the same as those described above for the substituent of the benzene ring A.

In the formula (II), carboxyl or sulfo should be contained in at least one of $R^{11}$, $R^{12}$, $R^{13}$, $R^{14}$, $R^{15}$, the substituent of the benzene ring B, and the substituent of the formed heterocyclic or aromatic ring.

Preferably, sulfo is contained in at least one of $R^{11}$, $R^{12}$, $R^{13}$, $R^{14}$, $R^{15}$, the substituent of the benzene ring B, and the substituent of the formed heterocyclic or aromatic ring.

Also preferably, carboxyl or sulfo is contained in at least two of $R^{11}$, $R^{12}$, $R^{13}$, $R^{14}$, $R^{15}$, the substituent of the benzene ring B, and the substituent of the formed heterocyclic or aromatic ring.

Further preferably, sulfo is contained in at least two of $R^{11}$, $R^{12}$, $R^{13}$, $R^{14}$, $R^{15}$, the substituent of the benzene ring B, and the substituent of the formed heterocyclic or aromatic ring.

Examples of the azo dyes of by the formula (I) are illustrated below.

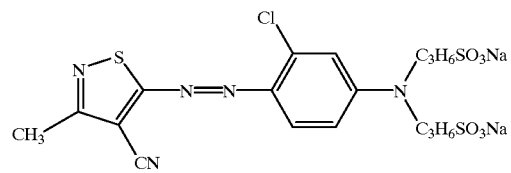

(101)

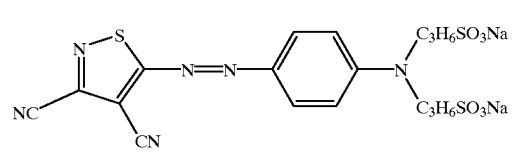

(102)

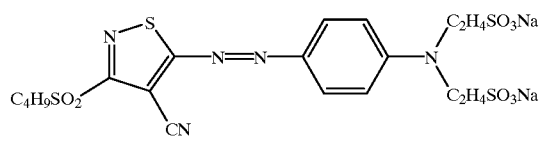

(103)

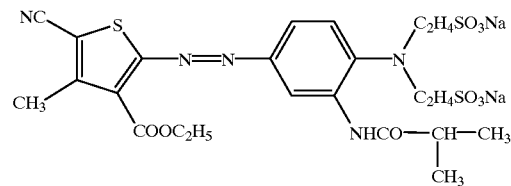

(104)

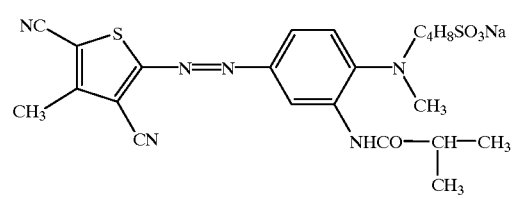

(105)

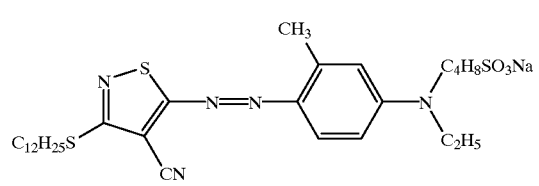

(106)

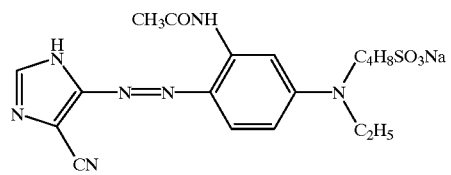

(107)

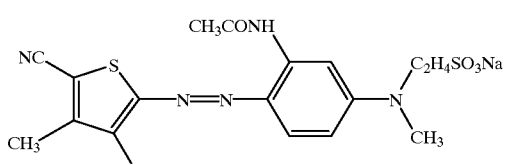

(108)

(109)
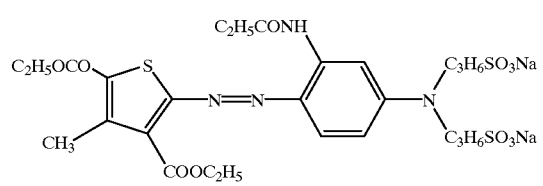
(110)
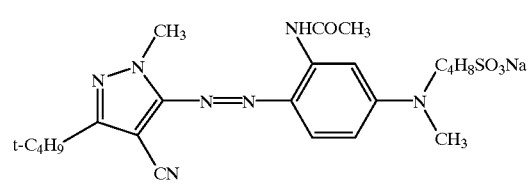
(111)
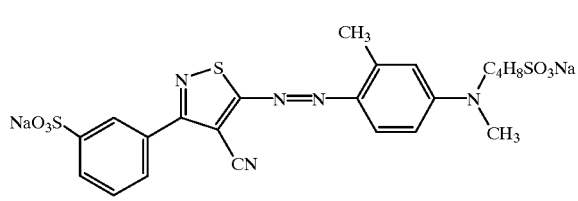
(112)
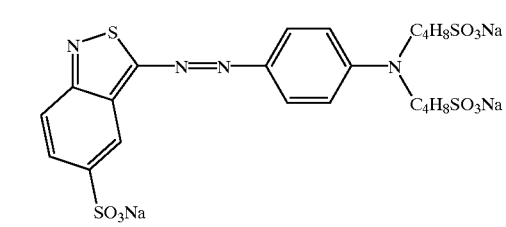
(113)
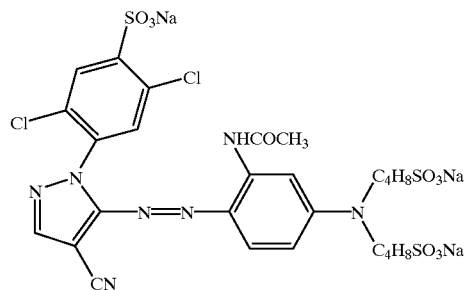
(114)
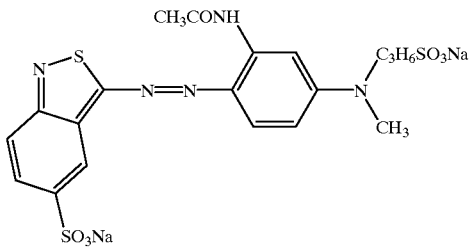
(115)
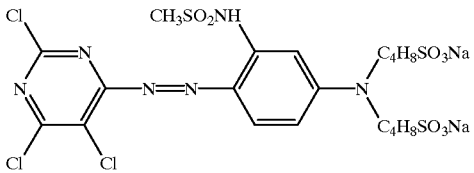
(116)
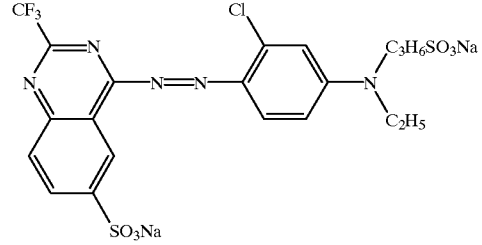
(117)
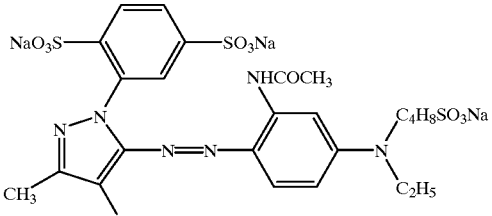
(118)
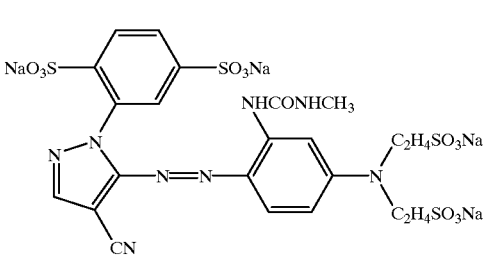
(119)
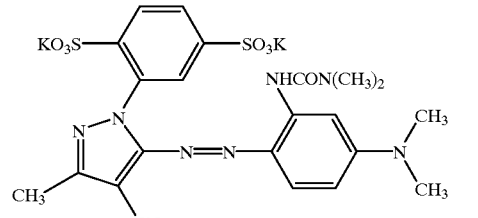
(120)
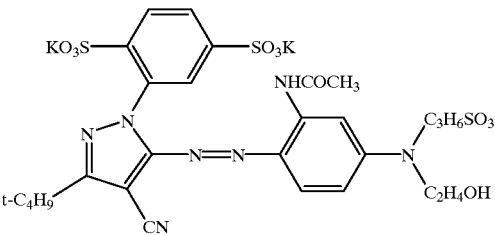
(121)
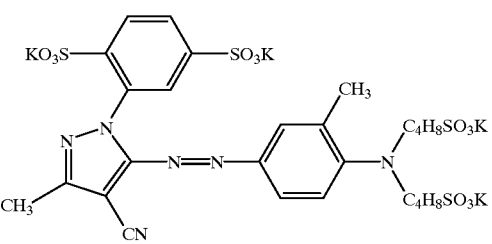

(122)
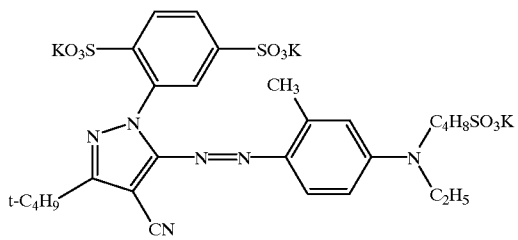
(123)
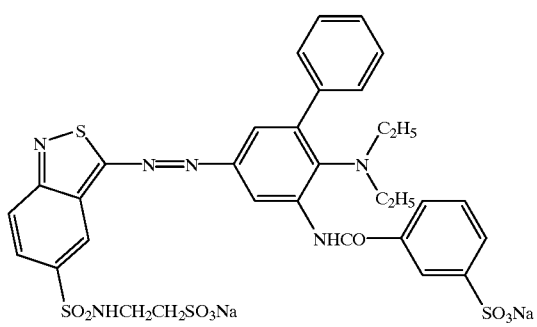
(124)
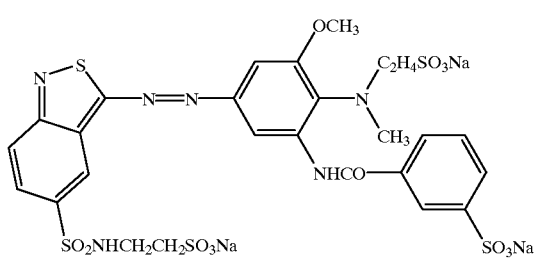
(125)
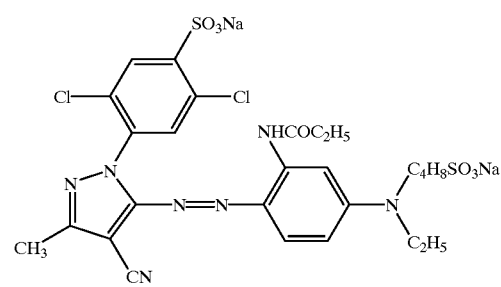
(126)
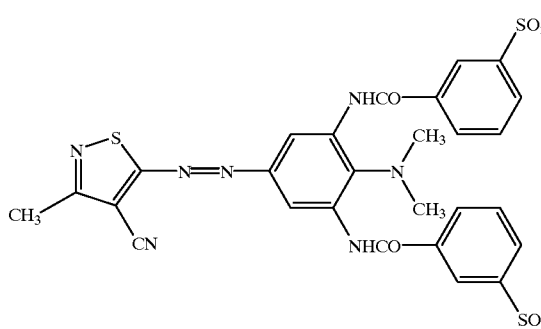
(127)
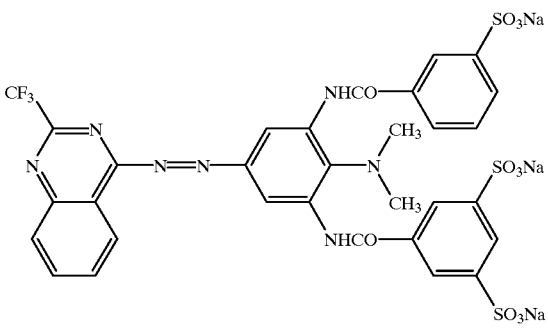
(128)
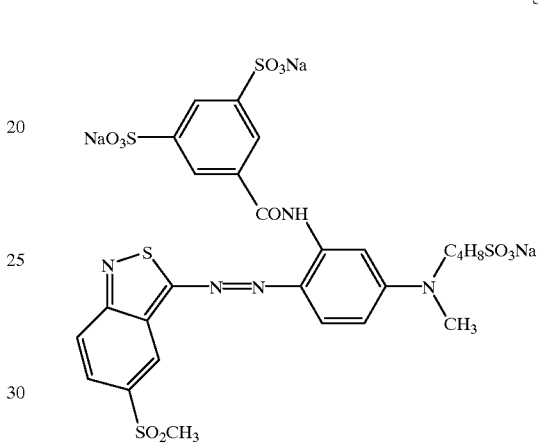
(129)
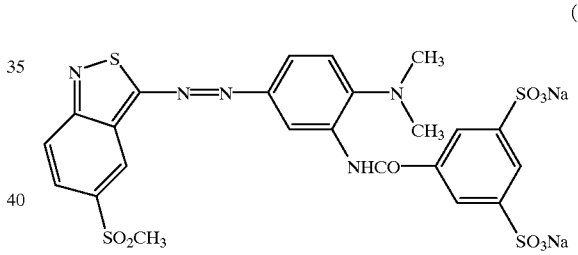
(130)
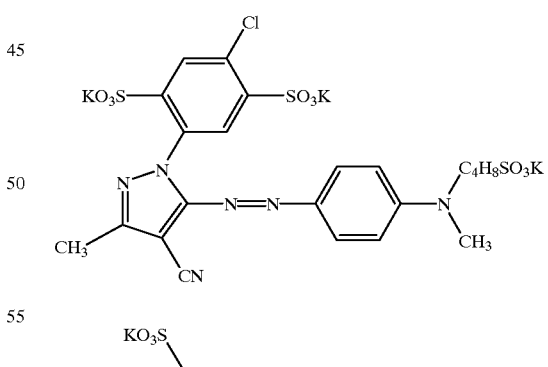
(131)
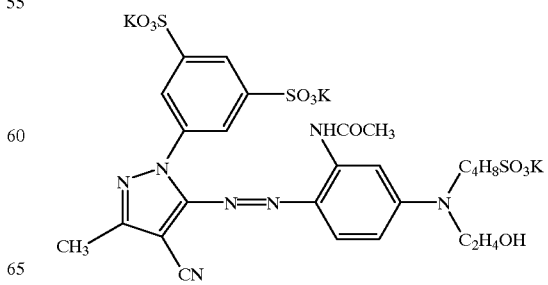

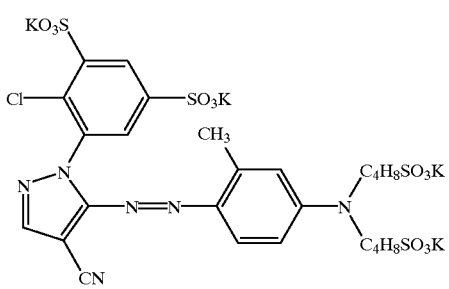

(132)

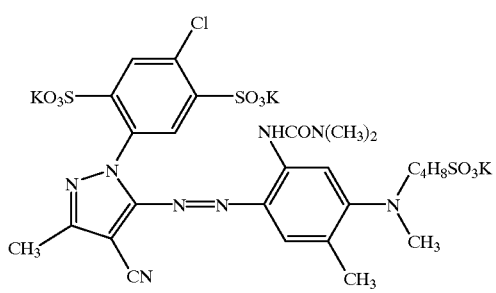

(133)

The azo dye of the formula (I) can be synthesized through the diazo coupling reaction between an aniline derivative of the formula (III) and the aromatic heterocyclic amine of by the formula (V), which can be illustrated as follows:

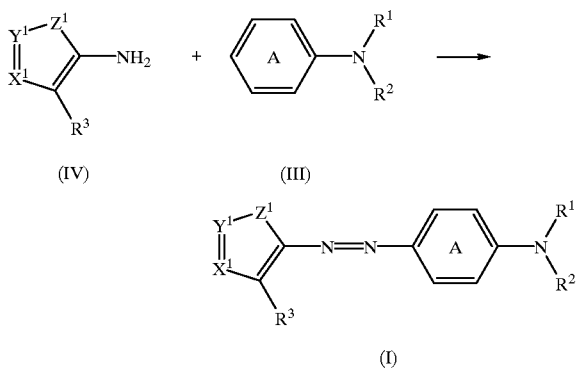

The medium of aqueous ink is an aqueous medium, such as water or a mixture of water and an organic solvent compatible with water. Examples of the water-compatible organic solvents include alcohols (e.g., methanol, ethanol, propanol, isopropanol, butanol, iso-butanol, secbutanol, t-butanol, pentanol, hexanol, cyclohexanol, benzyl alcohol), polyhydric alcohols (e.g., ethylene glycol, diethylene glycol, triethylene glycol, polyethylene glycol, propylene glycol, dipropylene glycol, polypropylene glycol, butylene glycol, hexanediol, pentane diol, glycerol, hexanetriol, thiodiglycol), glycol derivatives (e.g., ethylene glycol monomethyl ether, ethylene glycol monoethyl ether, ethylene glycol monobutyl ether, diethylene glycol monomethyl ether, diethylene glycol monobutyl ehter, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, ethylene glycol monophenyl ether), amines (e.g., ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, tetramethylpropylenediamine), and other polar solvents (e.g., formamide, N,N-dimethylformamide, N,N-dimethylacetamide, dimethylsulfoxide, sulforane, 2-pyrrolidone, N-methyl-2-pyrrolidone, N-vinyl-2-pyrrolidone, 2-oxazolidone, and 1,3-dimethyl-2-imidazolidinone, acetonitrile, acetone).

Two or more kinds of water-compatible organic solvents may be used in combination with water.

The azo dye may be dissolved or dispersed in an aqueous solvent (i.e., water or a mixture of water and a water-compatible organic solvent) to prepare aqueous ink. For dispersing, the dye is preferably made to be in the formo of fine particles by means of a dispersing machine (e.g., ball mill, sand mill, attriter, roll mill, agitator mill, Henschek mixer, colloid mill, ultrasonic homogenizer, pearl mill, jet mill, long mill). The azo dye may be dissolved in an organic solvent, and then the solution may be emulsified in an aqueous solution. For emulsifying, dispersing agents (emulsifiers) or surface active agents can be used. The preparation method of aqueous jet printing ink is described in Japanese Patent Provisional Publications No. H5-148436, No. H5-295312, No. H7-97541, No. H7-82515, and No. H7-118584.

The ink preferably contains the azo dye in an amount of 0.2 to 10 weight parts based on 100 weight parts of the ink. Besides the azo dye, other dyes may be contained in the ink.

In the jet printing ink, various additives can be contained, if desired. Examples of the additives include viscosity controlling agent, surface tension controlling agent, specific resistance controlling agent, film-formation controlling agent, UV absorber, anti-oxidizing agent, anti-fading agent, antifungal agent, rust inhibitor, dispersing agent, and surface active agent.

The aqueous ink preferably has a viscosity of not higher than 40 cp, and a surface tension of 20 to 100 dyn/cm.

For forming a full-color image, inks of magenta, cyan and yellow hues can be used. Further, ink of black hue can be used to control the hues of the image.

As recording paper (image-receiving sheet) for ink-jet printing, coat paper is preferred from the viewpoints of image quality and storing durability of image. Recording paper containing polymer mordant is also preferred. The polymer mordant is described in Japanese Patent Provisional Publication Nos. 48-28325, 54-74430, 54-124726, 55-22766, 55-142339, 60-23850, 60-23851, 60-23852, 60-23853, 60-57836, 60-60643, 60-118834, 60-122940, 60-122941, 60-122942, 60-235134 and H1-161236; and U.S. Pat. Nos. 2,484,430, 2,548,564, 3,148,061, 3,309,690, 4,115,124, 4,124,386, 4,193,800, 4,273,853, 4,282,305, and 4,450,224. A particularly preferred image-receiving material contains the polymer mordant described in Japanese Patent Provisional Publication No. H1-161236, pp. 212–215. The polymer mordant in the Publication gives an image of high quality, and improves light resistance of the image.

The image-receiving sheet for ink-jet recording may contain an inorganic pigment. Examples of the inorganic pigment include silica pigment, alumina pigment, titanium dioxide pigment, zinc oxide pigment, zirconium oxide pigment, mica-shaped iron oxide, white lead, lead oxide pigment, cobalt oxide pigment, strontium chromate, molybdenum pigments, smectites, magnesium oxide pigment, calcium oxide pigment, calcium carbonate pigment, and mullite. Two or more pigments may be used in combination.

The image-receiving sheet preferably comprises a hydrophilic layer (an ink-receiving layer) containing a hydrophilic binder. The binder preferably is a water absorptive polymer. Examples of the hydrophilic binders include gelatin, gelatin derivatives, polyvinyl alcohol, polyvinyl alcohol derivatives, polyalkyleneoxide, and polyalkyleneoxide derivatives. The hydrophilic binder is described in Japanese Patent Provisional Publication No. H1-161236, pp. 215–222.

The image-receiving material preferably contains a matting agent. The matting agent is described in Japanese Patent Provisional Publication No. H1-161236, pp. 263–264.

The ink-receiving layer in the image-receiving sheet is preferably hardened by a curing agent. The curing agent is described in Japanese Patent Provisional Publication No. H1-161236, pp. 222.

The layers constituting the image-receiving sheet may contain a surface active agent. The surface active agent serves as a coating aid, a releasing agent, a slipping agent and an antistatic agent. Japanese Patent Provisional Publication Nos. 62-173463 and 62-183457 describe the surface active agent.

In place of the surface active agent, organic fluorine compounds may be used. The organic fluorine compounds preferably are hydrophobic. Examples of the compounds include fluorine-contained surface active agents, oily fluorine compounds (e.g., fluorine oil), and solid fluorocarbon resins (e.g. tetrafluoroethylene resin). The organic fluorine compounds are described in Japanese Patent Publication No. 57-9053 (Column 8–17) and Japanese Patent Provisional Publication Nos. 61-20994 and 62-135826.

The layers (including a back coating layer) of the image-receiving sheet may contain a polymer latex. The polymer latex improves characteristics of the layers. For example, it gives dimensional stability, and inhibits curling, adhesion, and cracking of the layers. Japanese Patent Provisional Publication Nos. 62-245258, 62-1316648, and 62-110066 describe the polymer latex. A polymer latex having a low glass transition temperature (not higher than 40° C.) can prevent the layer containing a mordant from cracking and curling. On the other hand, a polymer latex having a high glass transition point can prevent the back coating layer from curling.

An anti-fading agent may be contained in the layers of the image-receiving sheet. The "anti-fading agent" include anti-oxidizing agent, UV absorber and metal complexes. Japanese Patent Provisional Publication No. H1-161236 pp. 225–247 describes the anti-fading agent.

The image-receiving sheet may contain a fluorescent whitening dye. The whitening dye may be added in the ink.

A particularly preferred support of the image receiving sheet is a plastic film or a sheet of paper having surfaces laminated with a film of polyolefin (e.g., polyethylene, polystyrene, polyethylene terephthalate, polybutene, and copolymers thereof). Preferably, a white pigment (e.g., titanium oxide, zinc oxide) or a coloring dye (e.g., cobalt blue, ultramarine, neodymium oxide) is added into the polyolefin.

Generally, the ink-jet recording method is performed in an on-demand system or in a continuous system. As the head for ink-jet recording (i.e., jet head), bubble jet type, thermal jet type, and ultrasonic type are known.

There are some types of the ink-jet recording method. For example, in one type, many small drops of thin ink (which is often referred to as "photo-ink") are jetted out. In another type, two or more inks having the same hue but different concentrations are employed so as to improve image quality. Further, colorless and transparent ink can be used for the ink-jet recording. The present invention is particularly effective in the ink-jet recording method in which many small drops of thin ink are jetted out to print a photographic image in a high speed.

EXAMPLE 1

[Preparation of Aqueous Ink]

The following components were mixed and stirred for one hour, while the mixture was heated at 30° C. to 40° C. The resultant liquid was filtered under pressure through a microfilter (average pore size: 0.8 μm, diameter: 47 mm) to prepare the liquid of ink A.

| ink A | |
|---|---|
| azo dye (102) | 4 weight parts |
| diethylene glycol | 9 weight parts |
| tetraethylene glycol monobutylether | 9 weight parts |
| glycerol | 7 weight parts |
| diethanolamine | 1 weight parts |
| water | 70 weight parts |

The aforementioned procedure was repeated except for changing the azo dye (102) into each dye shown in Table 1, to prepare ink B, C, D, E, F or G.

[Recording and Evaluation of Image]

In each ink of A to G, an image was printed on photo-gloss paper [Ink-jet paper (super photo grade), Fuji Photo Film Co., Ltd.] by means of an ink-jet printer [PM-700C, Seiko-Epson Co., Ltd].

Each printed image was evaluated from the viewpoints of hue and resistance against light. The hue was observed and classified into two grades, namely, A (good) and B (poor).

The resistance against light was estimated in the following manner. The sample image was exposed to xenon light (85,000 lux) by means of a weather meter [Atlas C, 165] for 3 days, and then the image density was measured by means of a reflection densitometer [X-Rite 310TR] at the points where the image density had been 1, 1.5 and 2.0 before the exposure. Thus, the ratios of residual dye at the three points were obtained. In accordance with the ratios of residual dye, each ink was classified into the following three grades.

A: the ratio at all the points were not less than 80%,

B: the ratio of less than 80% and that of not less than 80% were both obtained, and C: the ratios at all the ponts were less than 80%.

The results are set forth in Table 1.

| ink | dye | hue | durability |
|---|---|---|---|
| A | azo dye (102) | magenta (A) | B |
| B | azo dye (113) | magenta (A) | A |
| C | azo dye (117) | magenta (A) | A |
| D | azo dye (126) | magenta (A) | B |
| E | azo dye (131) | magenta (A) | A |
| F | the following dye (X) | magenta (B) | C |
| G | the following dye (Y) | magenta (B) | C |

Each of Dyes (X) and (Y) for comparison and have the following formula:

(X)

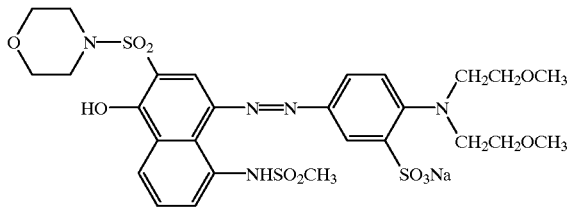

(Y)

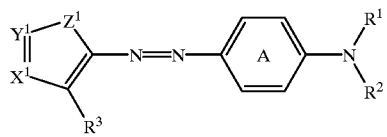

The dye (X) is described in Japanese Patent Provisional Publication No. H9-118849 [Dye No. 2].

The results in Table 1 indicate that the images of the inks A to E are clearer than those of the inks F and G. Further, it was also shown that the images of the inks A to E have excellent durability against light.

In each ink of A to E, an image was printed on a sheet of superfine gloss paper [MJA 4S3P, Seiko-Epson Co., Ltd.] by means of the ink-jet printer [PM-700C, Seiko-Epson Co., Ltd.].

The hue and the resistance against light of each printed image were evaluated in the aforementioned manner, and the same results as those in Table 1 were obtained.

What is claimed is:

1. A jet printing ink containing an azo dye represented by the following formula (I):

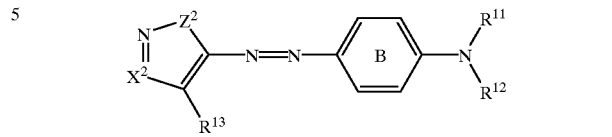

(I)

wherein $X^1$ is =N— or =CR$^4$—; $Y^1$ is —N= or —CR$^5$=; $Z^1$ is —S—, —NR$^6$— or —N=CR$^7$— in which the right end of each group connects to $Y^1$; the benzene ring A can have one or more substituents; each of $R^1$, $R^2$ and $R^6$ independently represents a hydrogen atom, an alkyl group, a cycloalkyl group, an aralkyl group, or an aryl group, said group possibly having one or more substituens; each of $R^3$, $R^4$, $R^5$ and $R^7$ independently represents a hydrogen atom, a halogen atom, cyano, hydroxyl, nitro, carboxyl, sulfo, an alkyl group, a cycloalkyl group, an aralkyl group, an aryl group, an alkoxy group, an alkylthio group, an acyl group, an acyloxy group, an alkoxycarbonyl group, an alkylamino group, an arylamino group, or an alkylsufonyl group; or a set of $R^1$ and $R^2$, $R^1$ and the substituent of the benzene ring A, $R^2$ and the substituent of the benzene ring A, $R^3$ and $R^4$, $R^4$ and $R^5$, or $R^5$ and $R^6$ can be combined to form a heterocyclic or aromatic ring which can have one or more substituents; and at least one of $R^1$, $R^2$, $R^3$, $R^4$, $R^5$, $R^6$, $R^7$, the substituent of the benzene ring A, and the substituent of the formed heterocyclic or aromatic ring has at least one carboxyl or sulfo group.

2. The ink of claim 1, wherein the azo dye is represented by the following formula (II):

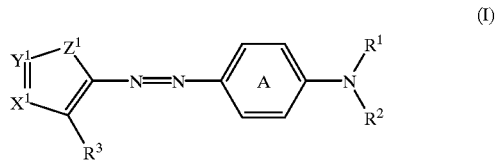

(II)

wherein $X^2$ is =N— or =CR$^{14}$—; $Z^2$ is —S— or —NR$^{15}$—; the benzene ring B can have a substituent; each of $R^{11}$, $R^{12}$ and $R^{15}$ independently represents hydrogen atom, an alkyl group, a cycloalkyl group, an aralkyl group or an aryl group, said group possibly having one or more substituents; each of $R^{13}$ and $R^{14}$ independently represents hydrogen atom, a halogen atom, cyano, hydroxyl, nitro, carboxyl, sulfo, an alkyl group, a cycloalkyl group, an aralkyl group, an aryl group, an alkoxy group, an alkylthio group, an acyl group, an acyloxy group, an alkoxycarbonyl group, an alkylamino group, an arylamino group or an alkylsulfonyl group; or a set of $R^{11}$ and $R^{12}$, $R^{11}$ and the substituent of the benzene ring B, $R^{12}$ and the substituent of the benzene ring B, or $R^{13}$ and $R^{14}$ can be combined to form a heterocyclic or aromatic ring which can have a substituent; and at least one of the substituent of $R^{11}$, $R^{12}$, $R^{13}$, $R^{14}$, $R^{15}$, the benzene ring B, and the substituent of the formed heterocyclic or aromatic ring has at least one carboxyl or sulfo group.

3. The ink of claim 1, wherein at least one of $R^1$, $R^2$, $R^3$, $R^4$, $R^5$, $R^6$, $R^7$, the substituent of the benzene ring A, and the substituent of the formed heterocyclic or aromatic ring has at least one sulfo group.

4. The ink of claim 1, wherein at least two of $R^1$, $R^2$, $R^3$, $R^4$, $R^5$, $R^6$, $R^7$, the substituent of the benzene ring A, and the substituent of the formed heterocyclic or aromatic ring has at least one sulfo or carboxyl group.

5. The ink of claim 1, which comprises an aqueous medium and the azo dye of the formula (I) that is dissolved in the aqueous medium.

6. The ink of claim 5, wherein the azo dye of the formula (I) is dissolved in an amount of 0.2 to 10 wt. %.

7. A method of forming an ink image on a receiving sheet using an ink jet printer, which comprises jetting drops of an ink containing an azo dye of the following formula (I):

(I)

wherein $X^1$ is =N— or =CR$^4$—; $Y^1$ is —N= or —CR$^5$=; $Z^1$ is —S—, —NR$^6$— or —N=CR$^7$— in which the right end of each group connects to $Y^1$; the benzene ring A can have one or more substituents; each of $R^1$, $R^2$ and $R^6$ independently represents a hydrogen atom, an alkyl group, a cycloalkyl group, an aralkyl group, or an aryl group, said group possibly having one or more substituens; each of $R^3$, $R^4$, $R^5$ and $R^7$ independently represents a hydrogen atom, a halogen atom, cyano, hydroxyl, nitro, carboxyl, sulfo, an alkyl group, a cycloalkyl group, an aralkyl group, an aryl group, an alkoxy group, an alkylthio group, an acyl group, an acyloxy group, an alkoxycarbonyl group, an alkylamino group, an arylamino group, or an alkylsufonyl group; or a set of $R^1$ and $R^2$, $R^1$ and the substituent of the benzene ring A, $R^2$ and the substituent of the benzene ring A, $R^3$ and $R^4$, $R^4$ and $R^5$, or $R^5$ and $R^6$ can be combined to form a heterocyclic or aromatic ring which can have one or more substituents; and at least one of $R^1$, $R^2$, $R^3$, $R^4$, $R^5$, $R^6$, $R^7$, the substituent of the benzene ring A, and the substituent of the formed heterocyclic or aromatic ring has at least one carboxyl or sulfo group.

* * * * *